United States Patent Office 3,610,102
Patented Oct. 5, 1971

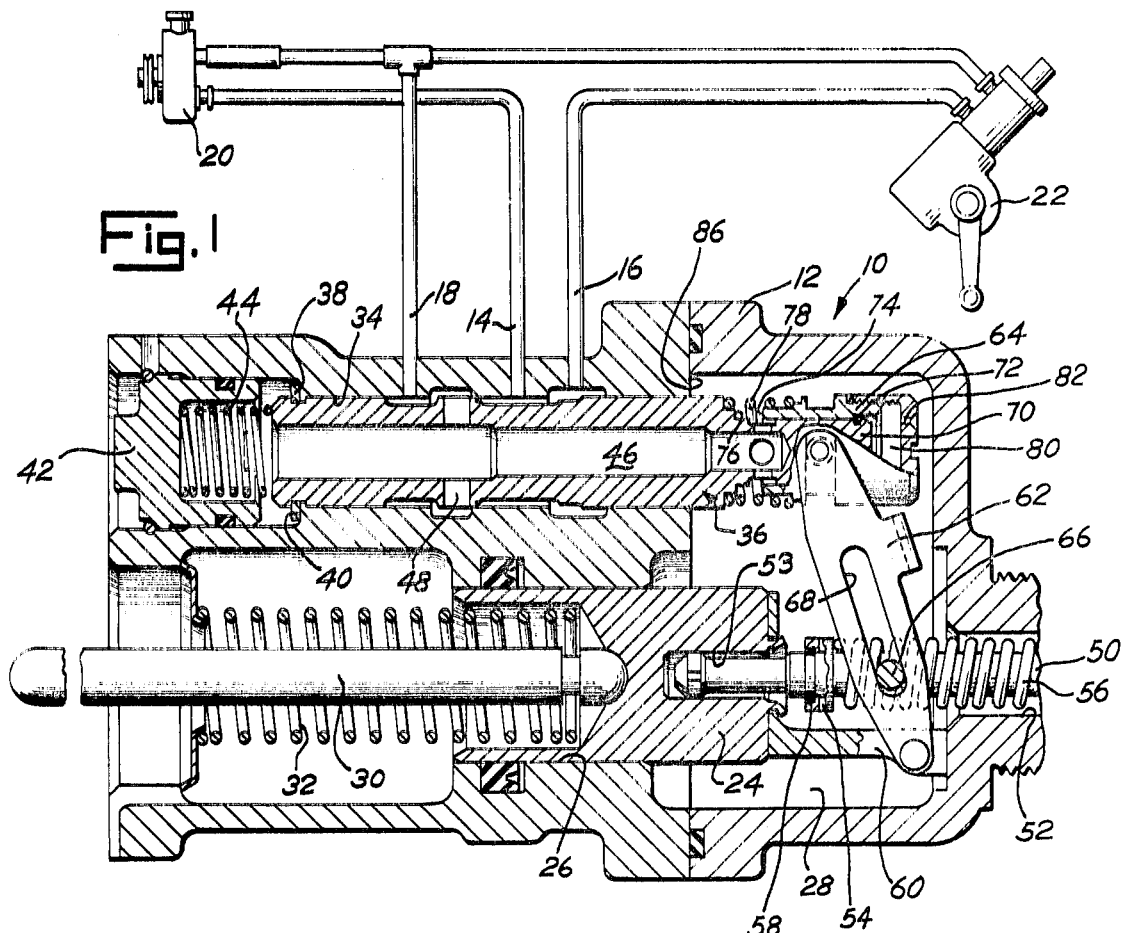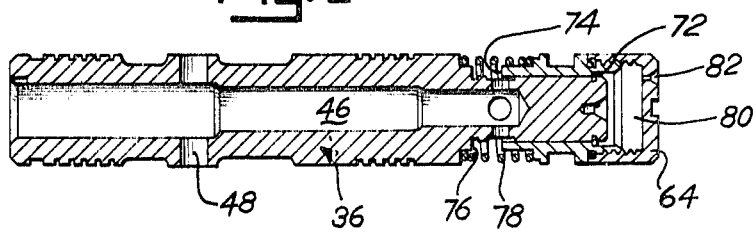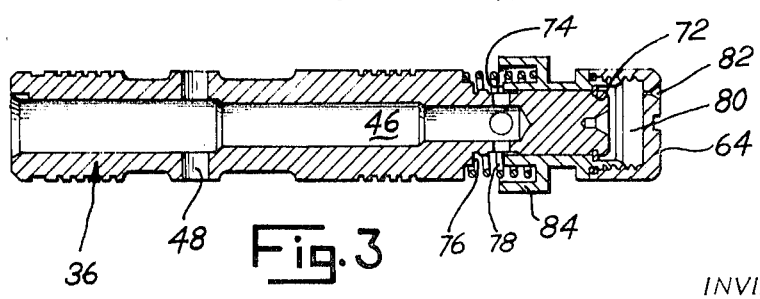

3,610,102
SAFETY DEVICE FOR HYDRAULIC BRAKE BOOSTER
Arthur K. Brown, Jr., South Bend, Ind., assignor to The Bendix Corporation
Filed May 18, 1970, Ser. No. 38,087
Int. Cl. F15b 7/00, 13/10
U.S. Cl. 91—391                                6 Claims

ABSTRACT OF THE DISCLOSURE

Fluid communication between a source of fluid pressure and the power chamber of a vehicle hydraulic brake booster is controlled by a spool valve that is operated by the vehicle operator. The spool valve is provided with internal passages through which the fluid flows. A sleeve is slidably mounted on the valve for closing the passages when a malfunction prevents movement of the valve. Movement of the sleeve is initially retarded during a brake application to prevent the sleeve from closing the passages when the vehicle operator abruptly applies his brakes.

BACKGROUND OF THE INVENTION

This invention relates to a hydraulic booster for use in the brake system of an automotive vehicle.

Hydraulic brake boosters possess many advantages over existing vacuum operated units, and are expected to be used in lieu of the latter on vehicles having power assisted brakes in the near future. Such a hydraulic booster is disclosed in U.S. patent application Ser. No. 793,923, filed Jan. 16, 1969, owned by the assignee of the present invention. The device disclosed in the aforementioned application permits manual actuation of the brakes should the supply of pressurized fluid to the unit be terminated or should a malfunction in the valve mechanism fail to communicate fluid into the unit. After an initial malfunction has initiated a manual brake actuation, the valve sometimes resumes normal operation, stopping the vehicle very abruptly. To obviate the defect, a sleeve has been slidably mounted on the spool valve to close the passages after an initial valve malfunction, as disclosed in copending U.S. patent application Ser. No. 17,486, filed Mar. 9, 1970, owned by the assignee of the present invention and incorporated herein by reference. However, when the vehicle operator very abruptly applies the brakes, valve inertia sometimes permits the sleeve to close the passages even when the valve does not malfunction.

SUMMARY OF THE INVENTION

Therefore, an important object of my invention is to insure that an abrupt brake application will not close the passages in the spool valve used in my hydraulic booster unless the valve malfunctions.

Another important object of my invention is to retard initial movement of a sleeve mounted on the spool valve when the vehicle operator applies the brakes.

Still another important object of my invention is to limit maximum pressure in the working chamber of a brake booster to a predetermined level, if desired, or alternatively to insure that pressure continues to increase in the working chamber until a pressure level is achieved equal to the capacity of the pump.

DESCRIPTION OF THE DRAWINGS

FIG. 1 is a fragmentary, longitudinal, partial cross-sectional view of a brake booster made pursuant to the teachings of my present invention;

FIG. 2 is a cross-sectional view of a spool valve used in the brake booster illustrated in FIG. 1; and FIG. 3 is a cross-sectional view of a spool valve used in another embodiment of my invention.

DETAILED DESCRIPTION

Referring now to the drawings, a brake booster 10 includes a housing 12 having an inlet port 14, an outlet port 16, and a return or exhaust port 18. The inlet port 14 is communicated to the high pressure side of a power steering pump 20, and the outlet port 16 is communicated to the inlet of a power steering gear 22. The outlet of the gear 22 is communicated to the inlet of the pump 20, as is the exhaust port 18.

A boost piston 24 is slidable in a longitudinal bore 26 within the housing 12. One end of the piston 24 is slidably received in a boost chamber 28 within the housing. A rod 30 connects the other end of the piston 24 with a master cylinder (not shown) mounted on the left side of the housing 12 viewing FIG. 1. Movement of the piston 24 to the left develops pressure in the master cylinder in the usual manner to apply the vehicle's brakes. A return spring 32 also engages the other end of the piston 24 to return the latter to its normal position upon release of the brakes.

Housing 12 further includes another bore 34 that communicates the ports 14, 16, 18 with each other and with the chamber 28. A spool valve 36 is shiftable within the bore 34 from a first position defined by the engagement of abutment means 38 on the valve 36 with a shoulder 40 on the housing 12 to a second position defined by the engagement of the spool valve 36 with the bore closure member 42. A spring 44 yieldably urges the valve 36 toward the first position, in which substantially all of the fluid flowing into the inlet port 14 is communicated directly to the outlet port 16 and the chamber 28 is vented to the low pressure side of the pump 20 through longitudinally extending passage 46, radially extending passages 48, and the exhaust port 18. As the valve 36 is shifted toward the second position, communication between the radial passages 48 and the exhaust port 18 is terminated, and a portion of the fluid flowing into the inlet 14 is directed through the passages 46 and 48 into the chamber 28 for shifting the piston 24. Details of the construction and operation of the valve 36 are more completely disclosed in copending U.S. patent application Ser. No. 13,415, filed Feb. 24, 1970, owned by the assignee of the present invention and incorporated herein by reference.

An operator-operated control rod 50 is slidably mounted in yet another bore 52 within the housing 12. One end of the rod 50 is secured to the usual brake pedal (not shown) mounted in the vehicle operator's compartment, and the other end of the rod 50 is slidably supported in a blind bore 53 within the piston 24. The control rod 50 extends through a sleeve 54, and a spring 56 urges the sleeve 54 against an abutment 58 on the rod 50 so that the rod 50 and sleeve 54 normally move together as a unit, but if the sleeve 54 is restrained from movement, the rod 50 can be moved relative to the sleeve 54.

A bracket 60 is mounted on the piston 24. One end of a pair of levers 62 is pivotally secured to the bracket 60 and the other end of the levers 62 are secured to a secondary valve member or closed-end cylinder 64 that is slidably mounted on the spool valve 36. The sleeve 54 is provided with pins 66 that are pivotally received within the slots 68 in the levers 62. Details of the construction and operation of the mechanism interconnecting the piston 24, the rod 50 and the cylinder 64 are more completely described in copending U.S. patent application Ser. No. 35,800, filed May 8, 1970, owned by the assignee of the present invention.

Closed end cylinder 64 is slidably mounted on the reduced diameter end portion 70 of the valve 36. Cylinder 64 is shiftable on the valve 36 from a first condition defined by the engagement of the cylinder with a stop ring 72 on the valve 36 in which flow of fluid from the passage 46 to the chamber 28 is permitted to a second position defined by the engagement of the end 74 of the cylinder 64 with a shoulder 76 on the valve 36. In the second condition, the cylinder 64 blocks flow of fluid between the passage 46 and the chamber 28. A spring 78 yieldably biases the cylinder 64 away from the shoulder 76. A variable volume chamber 80 is therefore defined by the end of the valve 36 and the cylinder 64. A metering orifice 82 is provided to permit flow of fluid into the chamber 80.

The valve shown in the embodiment of FIG. 3 is identical to the one illustrated in FIGS. 1 and 2, except that a shroud 84 extends from the cylinder 64 and is adapted to engage the surface 86 on the housing 12 circumscribing the bore 34.

MODE OF OPERATION

The brake booster illustrated in FIG. 1 is shown in the brake released position. In this position, low pressure fluid remaining in the chamber 28 flows through the orifice 82 to fill the chamber 80. When the vehicle operator depresses the brake pedal, movement of the control rod 52 is transmitted through the levers 62 to the cylinder 64 and through the spring 78 to the valve 36 to shift the latter toward its second position to admit high pressure fluid into the chamber 28 through the passage 42. If the valve malfunctions and fails to move, when the operator-applied force urging the cylinder 64 to the left viewing FIG. 1 exceeds the force of the spring 78, the cylinder 64 moves relative to the valve 36 to engage the shoulder 76 to thereby prevent sudden admission of fluid into the chamber 28 should the valve suddenly move after initiation of a manual brake application upon engagement of the rod 50 with the rod of the blind bore 53. The orifice 82 is sized to slowly meter fluid from the chamber 80 so that initial relative movement between the cylinder and valve is retarded. This prevents the cylinder 64 from closing the passage 46 when simple inertia delays movement of the valve 36 when the vehicle operator abruptly applies the vehicle's brakes.

In the device illustrated in FIGS. 1 and 2, if the vehicle operator starts the engine with his foot on the brake, the booster will operate manually until the operator releases the brake pedal, since the spool valve will have shifted to the second position and the cylinder 64 will have moved relative to the valve 36 to prevent flow of fluid into the chamber 28 when the engine is started. Similarly, if the vehicle engine dies during a brake application and is restarted, the operator must release the brake pedal in order to resume normal power braking. Also, the pressure output of the master cylinder is limited to a predetermined amount, since after the valve 36 is shifted to the second position, further movement of the control 50 moves the cylinder 64 to close the passage 52 to prevent more fluid from flowing into the chamber 28.

In a brake booster using the valve illustrated in FIG. 3, the pressure output of the master cylinder is not limited as it is in the embodiment of FIGS. 1 and 2. In this embodiment, the shroud 84 engages the surface 86 when the valve 36 is shifted into the second position to prevent the cylinder 64 from closing the passage 42. Therefore, fluid continues to flow into the chamber 28 as long as the vehicle operator continues to move the brake pedal. Similarly, if the vehicle engine is started while the brake pedal is depressed, the shroud 84 will prevent the cylinder 64 from preventing flow of fluid into the chamber 28. Power brake operation is therefore initiated as soon as the vehicle's engine is started.

I claim:
1. In a hydraulic boost device:
a housing having an inlet, an outlet, a bore communicating the inlet with the outlet, and a chamber in fluid communication with said inlet;
a piston slidable in said chamber;
valve means slidable in said bore from a first position in which substantially all of the fluid flowing through the inlet is directed to the outlet to a second position in which a portion of the fluid is directed into the chamber for shifting the piston;
passage means within said valve means for communicating fluid into the chamber when the valve means is disposed in the second position;
operator-actuated means in said housing;
mechanism interconnecting the valve means and the operator-actuated means;
said mechanism being movable on said valve means to close said passage means upon actuation of the operator-actuated means when movement of the valve means is prevented; and
means retarding movement of said mechanism on said valve means for a predetermined time after actuation of the operator-actuated means.
2. The invention of claim 1:
said mechanism having a portion cooperating with said valve means to define a variable volume fluid cavity therebetween;
said retarding means including orifice means for communicating the cavity with the chamber;
said orifice means being sized to meter flow therethrough from the cavity to thereby retard relative movement between the mechanism and the valve means.
3. The invention of claim 2:
resilient means disposed between said valve means and said mechanism for yieldably urging the latter away from the passage means.
4. The invention of claim 1:
said mechanism being a cylinder having a closed end;
said cylinder cooperating with the end of the valve means to define a variable-volume fluid cavity therebetween;
said retarding means including orifice means for communicating the cavity and the chamber;
said orifice means being sized to meter flow of fluid therethrough upon actuation of the operator-actuated means to thereby retard relative movement between the valve means and the cylinder.
5. The invention of claim 4:
resilient means disposed between said valve means and said mechanism for yieldably urging the latter away from the valve means.
6. In a hydraulic boost device:
a housing having an inlet, an outlet, a bore communicating the inlet with the outlet, and a chamber in fluid communication with said inlet;
a piston slidable in said chamber;
valve means slidable in said bore from a first position in which substantially all of the fluid flowing into the inlet is directed to the outlet to a second position in which a portion of the fluid is directed into the chamber for shifting the piston;
passage means within said valve means for communicat- ing fluid into the chamber when the valve means is in the second position;

mechanism slidable on said valve means;

operator-actuated means engaging said mechanism;

said mechanism sliding on said valve means to close said passage means upon actuation of the operator-actuated means when movement of the valve means from said first position is prevented;

stop means located within said housing; and abutment means extending from said mechanism adapted to engage said stop means upon further actuation of the operator-actuated means after the valve means is shifted to the second position to prevent said mechanism from closing said passage means.

References Cited

UNITED STATES PATENTS

| | | | |
|---|---|---|---|
| 2,766,732 | 10/1956 | Schultz | 60—54.6 P |
| 2,925,805 | 2/1960 | Schultz | 60—54.6 P |
| 3,064,431 | 11/1962 | Schnell | 60—52 B |

MARTIN P. SCHWADRON, Primary Examiner

A. M. ZUPCIC, Assistant Examiner

U.S. Cl. X.R.

91—469; 60—54.6 P; 137—596.1